2,808,757
FASHION PREVIEWING AND PROJECTION APPARATUS

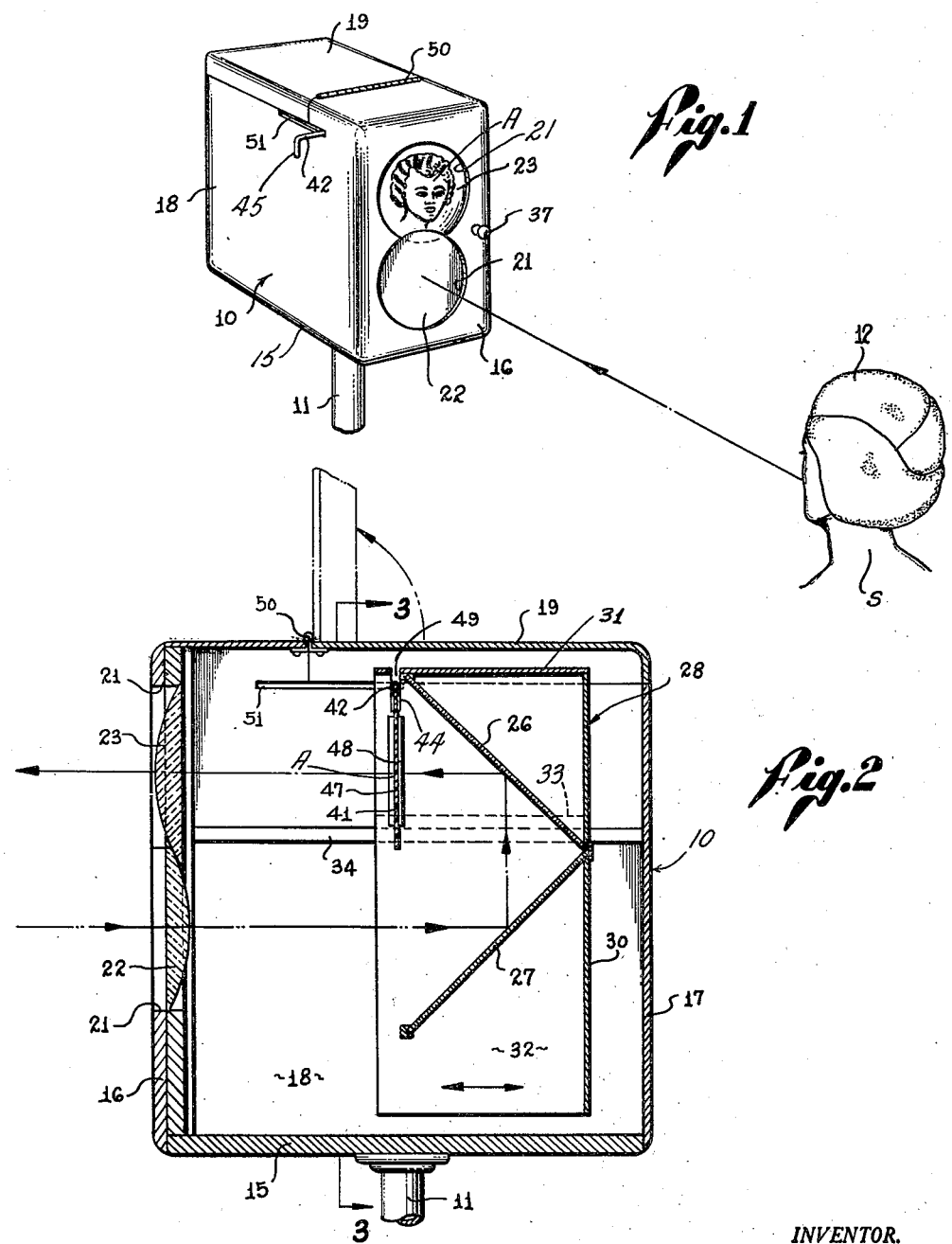
Oct. 8, 1957 — A. D. SCOTT — 2,808,757
FASHION PREVIEWING AND PROJECTION APPARATUS
Filed June 7, 1954 — 2 Sheets-Sheet 1
INVENTOR.
ARTHUR D. SCOTT Oct. 8, 1957 A. D. SCOTT 2,808,757
FASHION PREVIEWING AND PROJECTION APPARATUS
Filed June 7, 1954 2 Sheets-Sheet 2
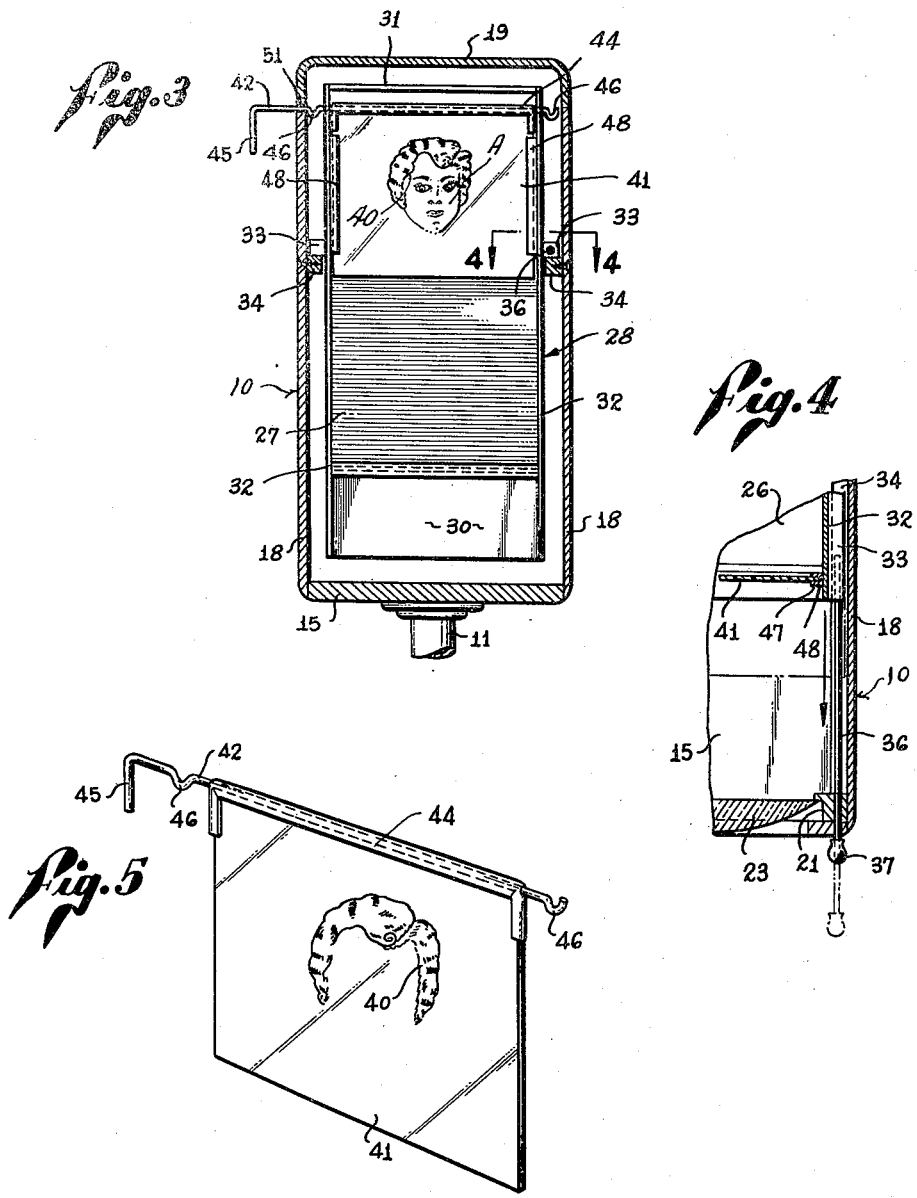
INVENTOR.
ARTHUR D. SCOTT
Attorneys United States Patent Office 2,808,757
Patented Oct. 8, 1957

Arthur D. Scott, Los Angeles, Calif.

Application June 7, 1954, Serial No. 434,767

10 Claims. (Cl. 88—24)

My invention relates generally to fashion previewing apparatus, and more particularly to an improved form of device of the type shown in my Patent No. 2,545,675, issued March 20, 1951, for Fashion Previewing Projection Apparatus.

This type of apparatus is utilized for viewing the effect of various coiffure or other fashion styled adornment on a particular person to aid his or her selection. The invention is advantageous in the art of creating individual hair styles or coiffures wherein a considerable amount of time and work is required to complete the coiffure and a preview of the result is highly desirable. Other uses are also apparent, such as in the creation of millinery, or the preselection of cosmetics.

The present invention is of the same general character as that disclosed in my aforementioned patent providing an instrument wherein a subject image is combined with a pictorial representation of a coiffure or other fashion styling to produce a view or picture of that person as he or she would appear dressed in such fashion. The instrument is further of the self-viewing type wherein the composite final image is readily visible to the subject appearing in the image.

With the foregoing in mind, it is a major object of this invention to provide an improved form of fashion previewing apparatus which creates a more realistic effect.

Another object of the invention is to provide a viewing instrument wherein a three dimensional space image of the subject is combined with the pictorial image of the fashion.

An equally important object of the invention is to provide a viewing instrument having an objective lens for creating an axial space image and a viewing lens for viewing said image combined with a pictorial image.

It is also an object of the invention to provide a viewing instrument of improved light transmitting characteristics, wherein the subject need not be illuminated with high intensity lights.

A further object of the invention is to provide a viewing instrument wherein the relative size of the pictorial image to the optical image may be adjusted to fit all conditions.

Still another object of the invention is to provide easily controlled means for moving the pictorial image along the path of the optical image rays for size adjustment.

These and other objects and advantages of the invention will become apparent from the following detailed description of a preferred form thereof, and from an inspection of the accompanying drawings in which:

Figure 1 is a perspective view of the complete viewing instrument;

Figure 2 is a vertical longitudinal section taken through the device;

Figure 3 is a cross section taken along the line 3—3 of Figure 2;

Figure 4 is a partial sectional detail taken along the line 4—4 of Figure 3; and Figure 5 is a perspective view of a transparent plate holder carrying the pictorial image.

Referring now to the drawings and particularly to Figure 1 thereof, a preferred embodiment of the apparatus is formed with a rectangular box-like housing 10 which is suitably supported on a pedestal or stand 11. The latter may have incorporated therein adjustment means for raising and lowering housing 10 so as to set the device at the correct height for a subject S seated some distance in front of the housing. The particular form of the invention herein illustrated is adapted for use in previewing selected coiffures, and in accordance therewith the subject S is provided with a net, or mask 12 which fits tightly around the head and binds her hair inwardly. Only the face of the subject S is therefore visible to the optical system of the viewer, and as will hereinafter be described, an optical image of the subject's face is combined with a pictorial image of selected coiffures to produce a composite image which is visible to the subject and operating personnel.

The housing 10 is of closed light-tight construction having a base 15, vertical front and back walls 16 and 17, respectively, side walls 18, and a top wall, or cover 19. Mounted within front wall 16 in suitable apertures 21 are a lower objective lens 22 and an upper viewing lens 23. The lens 22 and 23 are secured rigidly in place and have their optical axes substantially parallel, but spaced apart. Both lens 22 and 23 are positive lenses, being illustrated as plano-convex lenses which may be ground or cast to the desired shape. In order to permit the lens to be positioned in closely adjacent overlapping relationship, the lenses may be reversed to each other in curvature, but this does not change the optical characteristics of the system.

As is illustrated in Figure 1, the subject S is positioned in front of housing 10 with his or her face in substantial alignment with the optical axis of the lower objective lens 22. Light rays from the face of the subject S are therefore directed through lens 22 along the optical axis thereof to form an optical image of the subject within housing 10. It can be appreciated that the character of lens 22 is such that the optical image so formed is a real image of the subject, and the spacing of the subject to the housing is selected so that the image is of a reduced size. It should also be noted, that this image is inverted, and is an aerial or space image which is three-dimensional in proportion to the outline of the face of the subject.

The purpose of viewing lens 23 is to observe the space image of the subject's face created by the objective lens 22. In other words, the space image created by the objective lens 22 becomes an object for viewing lens 23 which in turn creates another image visible to the subject through the viewing lens. In may aforementioned patent, an image of the face of the subject was likewise created through the use of an objective lens, but such image was caught on a ground glass screen for observation. Two important advantageous results from my present invention over that previously disclosed; first by observing the subject image through the viewing lens, I am able to create in the eye of the subject or other observer, a three-dimensional space image rather than a necessarily flat plane image such as is formed on a ground glass screen, and, secondly, I am able to produce a much brighter image since the light transmission looses through the dispersion screen have been eliminated. The creation of a three-dimensional space image adds greatly to the realistic appearance of the final image, while the relative increases in image intensity makes the use of the viewer much more practical. While it was previously necessary to operate the viewer in a darkened room with high intensity floor or spotlights directed on the subject, the present invention permits the use of the viewer under normal room lighting without spotlighting.

In order to view the image formed by the objective lens 22 through the viewing lens 23, it is of course necessary to deflect the image rays from the optical axis of the lower lens up to the field of the upper lens. Also, since the image formed by the objective lens will be inverted, it is necessary to reinvert this image into an upright position. To this end, I provide reflecting means in the form of a pair of upper and lower reflecting plane surface mirrors 26 and 27, respectively. The mirrors 26 and 27 are preferably arranged at right angles to each other and at angles of 45° with the optical axes of lenses 22 and 23, being centered upon the axes and of such a size as to permit full coverage of all of the rays entering through the objective lens. The objective lens 22 forms the aperture stop for the system, but in practice both lenses are of a diameter such that only the center portion of the lenses need be used. This avoids the effects of spherical abberation and permits the use of relatively inexpensive cast lenses. As is best seen in the ray diagram of Figure 2, the mirrors 26 and 27 deflect the rays from lens 22 perpendicularly upward and thence back along the optical axis of upper lens 23. Only the center rays from the subject are diagramatically illustrated, but it can be understood that all of the rays from the lower lens are similarly deflected.

Mirrors 26 and 27 are mounted within a carriage 28 which is slidable front to back along the longitudinal axis of housing 10. As is best seen in Figures 2 and 4, the carriage 28 comprises a boxlike frame having a rear wall 30, a top wall 31, and parallel side walls 32. The front of carriage 28 is completely open so as not to interfere with the incidence of rays to and from mirror 26 and 27. Along the sides 32 are mounted outstanding elongated flanges 33 which are adapted to support the carriage 28 within housing 10. Guide tracks, or rails 34 are secured firmly to the interior of housing walls 18 and flanges 33 seat slidably thereon, thus permitting the front to back movement of the entire carriage 28. To control the movement of carriage 28 an operating rod 36 is secured thereto and extends forwardly through housing front wall 16. Rod 36 passes slidably through wall 16 and carries an outer control knob or handle 37 which is easily grasped for sliding the carriage back and forth.

So far described, I have accomplished the creation of a three-dimensional space image of the subject's face which is observed through the viewing lens 23. To preview the coiffure as it would appear on the head of the subject S, I provide a pictorial image of the hair style or coiffure 40 which is artistically created upon a transparent plate 41 in reduced size as shown in Figure 5. This image 40 is formed by line printing or photography so as to be somewhat transparent and thus reproduce the natural highlights. If desired, the image 40 may be done in color with tints or dyes so as to give a color effect. The improved light transmitting characteristics of the viewer as previously described make possible the use of color while still providing a final image of sufficient intensity for good observation. I have found that the plates 41 are quite easily scratched and marred in use if not properly handled and stored, and for this reason I provide a plate holder 42 which extends across the top of plate 41 in the form of a laterally elongated rod. An edge banding 44 may be utilized for securing rod 42 to plate 41 and for protecting the upper corners of the plate. Rod 42 is conveniently formed with an outer downturned portion 45 which is adapted to be positioned in a corresponding socket in a plate storage rack. The plates are thus readily available for selection, but are at the same time protected from surface contact with each other. Locating detents 46 may also be formed on rod 42 adjacent the sides of plate 41 if desired.

Plate 41 is adapted to be positioned within the front of carriage 28 in vertically extending guide slots 47 located in guide tracks 48 secured to the carriage side walls 32. The top carriage wall 31 is also slotted transversely at 49 to permit plate 41 to be inserted therethrough. In order to selectively place plates 41 within housing 10, a portion of the top housing wall 19 is hinged at 50 so that it may be lifted upwardly for access into the interior of the housing. When positioned in carriage 28, plates 41 are supported by holder 42 which rests on side walls 32. The end of holder 42 carrying the projection 45 extends outwardly through a horizontal slot 51 formed in one housing wall 18 and is thus free for longitudinal sliding movement with carriage 28.

From the diagram shown in Figure 2, it can be seen that the light rays passing forwardly along the optical axis of viewing lens 23 pass through the transparent portion of plate 41. Thus the plate 41 has no effect upon the formation of the space image of the subject's face which is formed by object lens 22. At the same time, the pictorial image 40 upon plate 41 becomes an object as viewed through lens 23. The image formed in the eye of the observer is therefore a composite image of the subject's face and the selected coiffure. The image of the subject's face is as previously pointed out a full three-dimensional image and the realism of the composite image is accordingly impressed. In optical design, the focal length of lenses is selected so that the space image of the subject's face is formed at or near the plane of the pictorial image. Thus, in the composite image observed, the coiffure appears to be at the same depth and over the face of the subject.

The purpose of having carriage 28 slidable relative to housing 10 is to adjust the length of the ray path from the objective lens to the viewing lens so that the size of the pictorial image 40 may be adjusted relative to the head or face size of the subject. In other words, the relative position of plate 41 along the ray path is changed by movement of carriage 28. Movement of carriage 28 changes the position of plate 41 relative to viewing lens 23, as well as the ray path between the objective lens 22 and the viewing lens, but it will be noted that the increase or decrease in the length of the total ray path is twice as great as the change in distance between plate 41 and the objective lens. Accordingly, the relative size of the space image of the subject's face to the pictorial image is changed by movement of carriage 28. Such movement of carriage 28 may also make a small shift of the face and coiffure depths in the final composite image, but I have found that this change is within the normal accommodation range of the eyes and no appreciable shift in depth is apparent from the subject's position.

In use, a variety of coiffure images deemed most appropriate by the hair stylist are selected. These coiffure images 40 are all scaled to normal face proportions, and the first is placed in the viewer. The subject S is seated in front of the viewer with her hair masked by the net 12 so that she is in alignment, and at proper spacing from the objective lens 22. The face of the subject and the coiffure image 40 then become visible through the viewing lens 23. It is to be understood, that the view shown in Figure 1 is merely illustrative in showing the appearance of the composite image, such image is not created upon the face of the viewing lens but is an image created in the eye of the subject when he or she looks at the viewing lens. Such an image is also created in the eye of the operator when he is standing in a suitable position, and the size of the image of the subject's face is adjusted so as to bring exact correspondence with the outline of the coiffure image 40 by movement of control knob 37. Thereafter, selected coiffures are tried in turn until the desired coiffure is found. Once the adjustment of image sizes is made for the first coiffure 40 no further size adjustment need normally be made for that particular subject.

While I have thus shown and described in some detail an illustrative embodiment of the invention adapted for a particular purpose, it can be understood that changes of design and construction will be apparent for other related uses. Therefore, I do not wish to be restricted, except as defined in the appended claims.

I claim:

1. Apparatus for self-viewing of an optical image of a person combined with a pictorial image which includes: a housing; an objective lens mounted in the front of said housing to produce an aerial optical image of a person in the field of said lens; a viewing lens mounted adjacent said objective lens in the field of view of said person; means for deflecting the image rays from said objective lens into the field of said viewing lens; and a transparent member having a pictorial image thereon positioned in the path of the rays through said lens in the zone of said optical image whereby said pictorial image and said optical image are combined in the image viewed through said viewing lens.

2. Apparatus for self-viewing of an optical image of a person combined with a pictorial image which includes: a housing; an objective lens mounted in the front of said housing to produce an aerial optical image of a person in the field of said lens; a viewing lens mounted in the front of said housing adjacent said objective lens and having the optical axis thereof substantially parallel to the optical axis of said objective lens; means for reflecting and inverting the image rays from said objective lens into the field of said viewing lens; and a transparent member having a pictorial image thereon positioned in the path of the rays between said lenses in the zone of said optical image whereby said pictorial image and said optical image are combined in the image viewed through said viewing lens.

3. Apparatus for self-viewing of an optical image of a person combined with a pictorial image which includes: a housing; an objective lens mounted in the front of said housing to produce an optical image of a person in the field of said lens; a vewing lens mounted adjacent said objective lens in the field of view of said person; means for deflecting the image rays from said objective lens into the field of said viewing lens; a transparent member having a pictorial image thereon positioned in the path of the rays between said lenses whereby said pictorial image and said optical image are combined in the image viewed through said viewing lens; and means for shifting the position of said member along the path of said image rays to adjust the size of the pictorial image relative to the size of said optical image.

4. Apparatus for self-viewing of an optical image of a person combined with a pictorial image which includes: a housing; an objective lens mounted in the front of said housing to produce an optical image of a person in the field of said lens; a viewing lens mounted adjacent said objective lens in the field of view of said person; means for reflecting and inverting the image rays from said objective lens into the field of said viewing lens; means for shifting the position of said last-mentioned means to increase the path length between said lens; and a transparent member having a pictorial image thereon positioned in the path of the rays between said lenses whereby said pictorial image and said optical image are combined in the image viewed through said viewing lens.

5. Apparatus for self-viewing of an optical image of a person combined with a pictorial image which includes: a housing; an objective lens mounted in the front of said housing to produce an optical image of a person in the field of said lens; a viewing lens mounted in the front of said housing adjacent said objective lens and having the optical axis thereof substantially parallel to the optical axis of said objective lens; means for reflecting and inverting the image rays from said objective lens into the field of said viewing lens; means for shifting the position of said last-mentioned means to increase the path length between said lenses; a transparent member having a pictorial image thereon positioned in the path of the rays between said lenses whereby said pictorial image and said optical image are combined in the image through said viewing lens; and means for shifting the position of said member along the path of said image rays to adjust the size of the pictorial image relative to the size of said optical image.

6. Apparatus for self-viewing of an optical image of a person combined with a pictorial image which includes: a housing; an objective lens mounted in the front of said housing to produce an optical image of a person in the field of said lens; a viewing lens mounted in the front of said housing adjacent said objective lens and having the optical axis thereof substantially parallel to the optical axis of said objective lens; a first reflecting surface in the rear of said housing on the axis of said objective lens and angularly disposed thereto to direct said image rays perpendicularly; a second reflecting surface in the rear of said housing on the axis of said viewing lens and in the path of said image rays to direct said rays from said first surface and produce an erect optical image in the field of said viewing lens; a removable transparent plate having a selected pictorial image thereon adapted to be positioned in the path of said rays between said lenses whereby said pictorial image and said optical image are combined in the image viewed through said viewing lens; and means for shifting the position of said plate along the path of said image rays to adjust the size of the pictorial image relative to the size of said optical image.

7. Apparatus for self-viewing of an optical image of a person combined with a pictorial image which includes: a housing; an objective lens mounted in the front of said housing to produce an optical image of a person in the field of said lens; a viewing lens mounted in the front of said housing adjacent said objective lens and having the optical axis thereof substantially parallel to the optical axis of said objective lens; a carriage slidably mounted in said housing for movement front to back therein; means mounted on said carriage for reflecting and inverting the image rays from said objective lens into the field of said viewing lens; and a transparent plate having a pictorial image thereon adapted to be removably mounted on said carriage in the path of the rays between said lenses whereby said pictorial image and said optical image are combined in the image viewed through said viewing lens, said plate being movable with said carriage and shifting relatively along the path of said image rays upon movement of said carriage to adjust the size of the pictorial image relative to the size of said optical image.

8. Apparatus for self-viewing of an optical image of a person combined with a pictorial image which includes: a housing; a positive objective lens mounted in the front of said housing to produce an optical image of a person in the field of said lens; a positive viewing lens mounted in the front of said housing adjacent said objective lens and having the optical axis thereof substantially parallel to the optical axis of said objective lens; a carriage slidably mounted in said housing for movement front to back therein; a pair of complemental reflecting surfaces mounted on said carriage and angularly disposed to deflect and invert the image rays from the axis of said objective lens to the axis of said viewing lens; a removable transparent plate having a selected pictorial image thereon adapted to be positioned in the path of said rays between said lenses whereby said pictorial image and said optical image are combined in the image viewed through said viewing lens; and guide means on the front of said carriage for removably supporting said plate on the axis of said viewing lens, said plate being movable with said carriage to shift relatively along the path of said image rays for adjusting the size of said pictorial image relative to the size of said optical image.

9. Apparatus for self-viewing of an optical image of a person combined with a pictorial image which includes: a housing; a positive objective lens mounted in the front of said housing to produce an optical image of a person in the field of said lens; a positive viewing lens mounted in the front of said housing adjacent said objective lens and having the optical axis thereof substantially parallel to the optical axis of said objective lens; a carriage slidably mounted in said housing for movement front to back therein; a first reflecting surface mounted in said carriage on the axis of said objective lens and angularly disposed thereto to direct said image rays perpendicularly; a second reflecting surface mounted in said carriage on the axis of said viewing lens and in the path of said image rays to direct said rays from said first surface and produce an erect optical image in the field of said viewing lens; a removable transparent plate having a selected pictorial image thereon adapted to be positioned in the path of said rays between said lenses whereby said pictorial image and said optical image are combined in the image viewed through said viewing lens; guide means on the front of said carriage for removably supporting said plate on the axis of said viewing lens, said plate being movable with said carriage to shift relatively along the path of said image rays for adjusting the size of said pictorial image relative to the size of said optical image; and manual control means extending through the front of said housing for moving said carriage relative to said housing.

10. Apparatus for self-viewing of an optical image of a person combined with a pictorial image which includes: a rectangular boxlike housing of lightproof construction having an openable top closure and guide tracks therein extending front to back along the sides thereof; a positive objective lens mounted in the front of said housing at the bottom thereof to produce an optical image of a person in the field of said lens; a positive viewing lens mounted in the front of said housing above said objective lens and having the optical axis thereof substantially parallel to the optical axis of said objective lens; a carriage within said housing having flanges slidable on said guide tracks for moving said carriage front to back of said housing; a first reflecting surface mounted in said carriage on the axis of said objective lens and angularly disposed thereto to direct said image rays perpendicularly; a second reflecting surface mounted in said carriage on the axis of said viewing lens and in the path of said image rays to direct said rays from said first surface and produce an erect optical image in the field of said viewing lens; a transparent plate having a selected pictorial image thereon adapted to be placed within said housing through said top closure to be positioned in the path of the rays between said lenses whereby said pictorial image and said optical image are combined in the image viewed through said viewing lens; guide means on the front of said carriage for removably supporting said plate on the axis of said viewing lens, said plate being movable with said carriage to shift relatively along the path of said image rays for adjusting the size of said pictorial image relative to the size of said optical image; and a control rod secured to said carriage and extending slidably through the front of said housing for moving said carriage relative to said housing.

References Cited in the file of this patent

UNITED STATES PATENTS

| | | |
|---|---|---|
| 1,849,308 | Mihalyi | Mar. 15, 1932 |
| 2,061,378 | Henze et al. | Nov. 17, 1936 |
| 2,075,198 | Henze et al. | Mar. 30, 1937 |
| 2,105,557 | Slack | Jan. 18, 1938 |
| 2,293,271 | Von Knauf | Aug. 18, 1942 |
| 2,536,866 | Barcus | Jan. 2, 1951 |
| 2,545,675 | Scott | Mar. 20, 1951 |
| 2,589,363 | Foufounis | Mar. 18, 1952 |